United States Patent [19]

Silverberg

[11] Patent Number: 4,666,144

[45] Date of Patent: May 19, 1987

[54] PLURAL SPEED BELT DOCUMENT FEEDER

[75] Inventor: Morton Silverberg, Rochester, N.Y.

[73] Assignee: Xerox Corporation, Stamford, Conn.

[21] Appl. No.: 788,374

[22] Filed: Oct. 17, 1985

[51] Int. Cl.[4] .............................................. B65H 5/02
[52] U.S. Cl. ................................... 271/270; 271/114; 271/116; 192/48.92
[58] Field of Search ............... 271/270, 114, 116, 275; 74/661, 665 A, 665 B, 665 R; 192/48.1, 48.92, 0.098

[56] References Cited

U.S. PATENT DOCUMENTS

| | | | |
|---|---|---|---|
| 3,214,998 | 11/1965 | Hall | 74/661 |
| 3,473,035 | 10/1969 | Gardner et al. | 250/219 |
| 3,674,363 | 7/1972 | Baller et al. | 355/14 |
| 3,743,274 | 7/1973 | Komori | 271/3 |
| 3,882,734 | 5/1975 | Obermann et al. | 192/48.92 |
| 4,315,439 | 2/1982 | Grachtrup | 74/661 |
| 4,450,942 | 5/1984 | Takefuta et al. | 192/48.92 |
| 4,462,527 | 7/1984 | Taylor et al. | 226/15 |
| 4,481,841 | 11/1984 | Abthoff et al. | 74/661 |

*Primary Examiner*—Duane A. Reger
*Assistant Examiner*—Matthew C. Graham

[57] ABSTRACT

In a drive system for a document feeder transport for a copier with a drive output normally driven at a high speed for document transport and driven at a lower speed for document registration at a registration position, the improvement wherein the drive system comprises a drive motor and a high speed drive normally driving the document feeder transport through a normally closed clutch in the high speed drive, and a reduction speed system also simultaneously driven by the drive motor, the reduction speed system including a normally over-driven over-running clutch connected to, but normally disengaged by, the high speed drive, and a system for automatically rapidly and smoothly switching the drive output to the lower speed, as the document approaches the registration position, by opening the normally closed clutch in response thereto, whereby the high speed drive is disengaged and shortly thereafter the reduction speed system automatically begins to drive the drive output at the lower speed by the automatic engagement of the over-running clutch upon the slowing down of the drive output to the lower speed. Preferably the normally closed clutch and the normally over-driven over-running clutch and the drive output are axially combined on a common drive shaft.

2 Claims, 9 Drawing Figures

PLURAL SPEED BELT DOCUMENT FEEDER

For a copier with a dual-speed original document platen transport, there is disclosed an improved, low-cost and quiet drive system for providing a normal high transport speed yet automatic switching to a lower transport speed for document registration.

The art of original document sheet feeding for copiers has been intensively pursued in recent years. Automatic or semi-automatic feeding of the documents to be copied over the imaging station (platen) of the copier and into a registered copying position thereon has become essential for fully utilizing the productivity of higher speed copiers, and is highly desirable for almost all copiers. Lower cost, more compact, and lighter weight document handlers are particularly desired. Various of the difficulties and particular problems connected with such document feeding are discussed in further detail in the references cited herein. Document platen transport feeders must reliably overcome various and conflicting requirements. The platen transport must repeatedly feed document sheets over the platen and into registration without causing wear or other damage to either the documents or the platen glass. The document must be initially transported without substantial skew or slippage but then must be rapidly stopped in a desired or defined imaging position, usually with at least one edge of the document aligned with at least one edge of the platen. An effective and low cost such system utilizes multiple belts and document stopping registration fingers insertable between the belts into the document path to stop the document at the desired registration position. Examples are disclosed in U.S. Pat. Nos. 4,470,591 issued Sept. 11, 1984 to T. Acquaviva; 4,322,160 issued Mar. 30, 1982 to G. S. Kobus; 3,844,552 issued Oct. 29, 1974 to C. D. Bleau et al, etc. One example of a registration gate movable in and out of the document path from above the platen (from inside the document handler) is disclosed in U.S. Pat. No. 4,256,298 issued Mar. 17, 1981 to D. K. Ahern. Other examples are shown in U.S. Pat. No. 4,135,808 cited below, etc.

Various other examples of document registration fingers or gates are disclosed in numerous of the other references cited herein. Of particular interest as disclosing fingers which are resilient or connected with resilient springs, albeit functioning in a different manner, are U.S. Pat. No. 4,456,243 issued June 26, 1984 to P. De Simone, the above-cited U.S. Pat. No. 4,256,298 to Ahern, and Xerox Disclosure Journal, Vol. 6, No. 5, September/October 1981, pp. 239–240. Some other examples of retractable sheet registration fingers are disclosed in U.S. Pat. No. 4,400,085 issued Aug. 23, 1983 to T. Nezu; U.S. Pat. No. 4,330,117 issued May 18, 1982 to G. Weisbach and U.S. Pat. No. 3,072,397 issued Jan. 8, 1963 to H. E. Kelchner.

However, as observed in various of the references cited herein, such multiple belt transports have very serious "printout" problems with "show-around" and "show-through". "Show-through" is the printing out of dark areas on the copy sheet because the copier optics "sees" dark areas on the document transport through the document, particularly through a transparent or very thin or otherwise translucent document. "Show-around" occurs when the document is mis-registered, or a reduction copy is being made, which directly exposes areas of the platen transport beyond one or more edges of the original. Both of these types of copy defects are particularly likely with plural belt document transports, because all of the belt edges and apertures of conventional such belts tend to have both edge shadows and dirt contamination (visible darkening) of the belt edges, particularly since such belts are conventionally of a relatively thick, opaque, originally white, high friction elastomeric material. This produces very undesirable dark lines on the copy sheets.

Another conflicting requirement and difficulty with platen transports, including multiple-belt transports, is that they conventionally utilize an elastomeric belt surface to provide a sufficiently high frictional force between the moving belt and the document for reliable transport. This force is often excessive for registration of the document. That is, when the belt or belts drive the document into a mechanical registration gate, such as registration fingers between the belts, a controlled slippage must be provided at that point between the belts and the document to avoid over-driving the document into the registration fingers and damaging it. Various modifications have been provided, including applying oil to the belt, applying variable force backing rollers, etc..

One attempted solution has been to use vacuum belt transports, or a combination of frictional feeding by the belt assisted by a partial vacuum applied through apertures in the belt to retain or pull the document or portions thereof against the belt, or belts. This is taught in the cited art also. An example of a document feeder with multiple perforated vacuum belts, and registration gate fingers interleaved therewith for stopping the document while the moving belts slip relative thereto, is illustrated in U.S. Pat. No. 4,135,808 issued Jan. 23, 1979 to D. I. Morrison (Pitney-Bowes, Inc.). However, most vacuum belt document transports have not utilized positive mechanical registration gates, because they are typically non-slip transports, requiring a servo or calculated stop of the belt as the document reaches the registration position.

The combination of frictional drive belts and vacuum channels therebetween for feeding other types of sheets is, of course, known in other applications, e.g., U.S. Pat. No. 4,211,399 issued July 8, 1980 to N. L. McGowan and U.S. Pat. No. 4,411,420 issued Oct. 25, 1983 to J. Louis et al and U.S. Pat. No. 4,474,367 issued Oct. 2, 1984 to H. W. Jongerling et al. These other systems also teach means for applying or removing the vacuum from selected areas. However, these systems are not designed for providing an effectively invisible background for documents being copied on the copier, especially typically translucent documents.

Vacuum belt transports have introduced serious additional problems of "show-around" and "show-through" copy defects. These are undesirable dark background markings on the copy sheets from images of edge shadows, and contamination of the edges, of the vacuum apertures in the belt, and also in the underlying vacuum manifold or plenum surface for the belt or belts.

Of particular interest to the present application is the following art related to addressing this problem, some of which includes the suggestion of a transparent or translucent belt: European Patent Application No. 49163 published Apr. 7, 1982 and U.S. Pat. No. 4,295,737 issued Oct. 20, 1981, both by the subject inventor, Morton Silverberg. Also, U.S. Pat. No. 4,412,738 issued Nov. 1, 1983 to D. K. Ahern et al; and U.S. Pat. No. 4,544,265 issued Oct. 1, 1985 to E. A.

Powers, filed Sept. 21, 1983. Another transparent belt vacuum document transport, a single wide apertured belt, is disclosed in Japanese Applications No. 57-100951 filed June 12, 1982 by Y. Nogami (Fiju Xerox Co., Ltd.), (FX/5826), (Presumably published approximately 18 months after said application date.) Other attempts to prevent belt holes or manifold holes from printing out are disclosed in U.S. Pat. No. 4,294,540 issued Oct. 13, 1981 to R. R. Thettu, and equivalents and U.S. Pat. No. 4,047,812 issued Sept. 13, 1977 to James W. Hogan. In addition to the specific discussion in the abovecited Thettu U.S. Pat. No. 4,294,540 relevant to the subject art, the importance of locating vacuum manifold holes outside of an imaging area is also known for stationary film copying holders, such as U.S. Pat. No. 4,099,867 issued July 11, 1978 to H. A. Spence-Bate.

Single large white document platen transport belts as illustrated in patents cited above have been used in various commercial document feeders for copiers to avoid the above-described undesirable copy background markings typical of multiple belt transports. However, single large belts do not provide the important advantage of multiple belt transports in allowing the registration fingers to be interdigitated with the belts and inserted from above or below the platen directly into the document path for reliable capture of the leading edge of the document being moved by the belts, for reliable registration. Also such large single belts, in a frictional document transporting system, usually require a variable force system, such as liftable backing rollers, to avoid overdriving the documents into the registration gate by allowing increased slippage only during the registration portion of the transporting operation. The normal force must then be restored to prevent excessive slippage for normal document movement, and the coefficient of friction required is high and relatively critical in its allowable range.

Various other schemes have been attempted to eliminate the showthrough and show-around problems of vacuum apertures and document belts. For example by using a transparent belt and special reflectors behind the belt as in U.S. Pat. No. 4,120,579 issued Oct. 17, 1978 to D. J. Maiorano, using very small holes as in the abovecited Hogan patent, or covering a perforated Mylar (trademark) plastic belt with foam rubber or synthetic fiber material as disclosed in Col. 7 of U.S. Pat. No. 4,008,956 issued Feb. 22, 1977 to D. L. Stemmle. In this regard it is interesting to note that while there have been other suggestions, e. g. the Xerox Disclosure journal Vol. 6, No. 5, September/October 1981, p. 231, to make the document belt from plastic, such as a polyester film as suggested there, that the actual working surface of the belt even in the latter reference was a coating of material having high frictional properties such as urethane. In general, commercial xerographic document feeders utilize document feeding belts of urethane elastomer-type materials having the correspondingly high coefficient of friction of such materials.

A single thin and very narrow transparent "Mylar" plastic belt 70 is provided in U.S. Pat. No. 4,033,694 issued July 5, 1977 to P. T. Ferrari. However, as described therein, e. g. Cols. 11 and 12, this belt is for stripping documents from a single and apertured vacuum belt 16 (i.e. not for transporting the documents). Said Ferrari patent also discloses feeding the subsequent document to be copied onto the platen with the vacuum transport system simultaneously with the ejecting of the previous document (Col. 10, second paragraph). However this transport is of a fixed distance drive, non-slip-page, type with no registration gates or fingers.

A serious disadvantage of such elastomeric surface belts is that they are typically relatively thick and thus particularly subject to edge shadows and edge contamination on the edges of the belt and on the edges of holes in the belt. Elastomeric belts cannot be made thin without having undesirable mechanical properties i.e. excessive stretching or vibration during operation. The surfaces of elastomeric belts are also particularly prone to visible black marks and other contamination.

It is known to reduce the speed of the document platen transport belt or wheels as the document approaches the registration fingers, to reduce the impact velocity and potential for damage and to provide improved deskewing. Deskewing is provided by the impacting of a skewed document with one of the fingers, and continued driving of the document to cause its partial rotation into alignment with the other fingers.

Some general examples of document transports in which the document is slowed down for registration are U.S. Pat. No. 3,674,363 issued July 4, 1972 to E. O. Baller et al, e.g. Cols. 8 and 9, second paragraph, and Col. 10, first paragraph, and U.S. Pat. No. 3,473,035 issued Oct. 14, 1969 to J. F. Gardner. Also, U.S. Ser. Nos. 678,859 and 678,859 filed Dec. 6, 1984 by T. S. Pinckney and H. J. Sanchez. U.S. Pat. No. 4,213,603 issued July 22, 1980 to R. M. Peffer et al is cited for its suggestion of resilient members 38 placed in the path of the document to decelerate the document sheet as it approaches the registration position.

However, many of these deceleration systems are not in or suitable for positive or impact type registration systems, rather they are for intermittent drive, controlled stop, systems, requiring precise mechanical belt drive systems. These require sufficient power for the rapid belt drive accelerations and decelerations required for each document exchange on the platen. Just slowing the transport velocity each time the sheet is about to be registered is difficult, particularly for a higher speed system, because of the moving masses involved. It is difficult to accomplish without a more expensive servo motor drive, or high speed clutches and gear changes or brakes. The latter tend to be noisy in operation. Thus, it is preferable to continue running the platen belt transport system, at the same speed, i.e. at the full transport velocity, and to instead reduce the pneumatic forces holding the document against the belt or belts, thereby proportionately reducing the frictional driving force of the belts acting on the document as it approaches registration.

To avoid excessive rubbing of the moving belts against the document if the document is held in the registration position for more than a few copies at a time, the belt transport motor can be automatically shut off in response to that mode of copying, as for example in the Kodak "Ektaprint" "150" "P" Models. The belt drive can be then restarted upon the conclusion of copying of that document. It will be noted however, that such immediately sequential multiple copies of a document are normally only made in a nonprecollation copying mode, where a sorter or other post collation apparatus is required to provide collated copies. In precollation copying normally only one copy at a time, or at the most two, is made of each document sheet as it is being recirculated, and plural circulations are made to provide plural copy sets. Thus there is no need to shut off the transport if the belt friction on the documents is not excessive.

The above-discussed problem of the need to reduce the document transporting force just as the document reaches the registration position to avoid over-driving the document against registration fingers is known in some vacuum belt document transport art. In the above-cited U.S. Pat. No. 4,295,737 to the same M. Silverberg, as described in Col. 6, a solenoid actuated flapper belt may be utilized to quickly reduce the vacuum in the vacuum manifold, and therefore the vacuum force transporting the document, in coordination with registration. Likewise, U.S. Pat. No. 4,282,380 issued Dec. 7, 1982 to R. T. Dragstedt, and the Xerox Disclosure Journal Vol. 4, No 2, March/April 1979, pp. 213–21.

Vacuum reduction systems are also known for other functions in document feeding. For example, for an air knife document separator dump valve, as shown in U.S. Pat. No. 4,328,928 issued June 29, 1982 to R. E. Smith et al.

As will be appreciated from the above references, when the document platen transport is a single large white belt, the belt itself forms the imaging background or effective platen cover for the copier platen. Where smaller or plural spaced belts are provided, or the belt is apertured, an additional image background surface must be provided. In a vacuum transport system, this may be the lower surface of the vacuum plenum or manifold supplying a partial vacuum for the document transport, as described by various of the above references, of which said Thettu U.S. Pat. No. 4,294,540 is of particular interest. Where this background surface is the bottom of the manifold or plenum, it is normally fixed relative to the document handler unit.

In a non-vacuum feeding system the imaging background surface member may be mounted to conform to the platen surface, directly or by a preset spacing. U.S. Pat. No. 4,538,649, issued 9/3/85, based on U.S. Ser. No. 526,730 filed Aug. 26, 1983 by S. J. Wenthe, Jr., is of interest as teaching an auxiliary platen cover 32 with spacers 18 which are integral extensions of the otherwise planar white bottom surface of this cover 32. These platen spacers are adapted to rest directly against the platen glass 12, or an adjacent part of the copier, to support the auxiliary platen cover 32 slightly spaced over the platen by a fixed distance provided by the spacers, preferably sufficiently close to hold documents to within the depth of field or focus of the imaging system of the copier. This system is in commercial use as a computer forms feeding accessory kit for the Xerox "1075" copier. Also noted in this regard is U.S. Pat. No. 3,888,581 issued June 10, 1975 to John R. Caldwell.

It is a general feature of the document handling system disclosed herein to provide a document platen transport and registration system which overcomes various of the above-discussed problems, and combines various desirable features, in particular which provides the positive registration gate system of a multiple belt transport with the advantages of a vacuum transport system, yet avoids or greatly reduces the serious "show-through" and "showaround" copy defects of conventional multiple belt, and particularly apertured multiple belt, transport systems, in an economical and lightweight system providing reliable document feeding, registration, and document protection.

A specific feature of the system as disclosed herein is to provide in a drive system for a document feeder transport for a copier with a drive output normally driven at a high speed for document transport and driven at a lower speed for document registration at a registration position, the improvement wherein said drive system comprises a drive motor and a high speed drive normally driving said document feeder transport through a normally closed clutch in said high speed drive, and a reduction speed system also simultaneously driven by said drive motor, said reduction speed system including a normally over-driven over-running clutch connected to, but normally disengaged by, said high speed drive, and means for automatically rapidly and smoothly switching said drive output to said lower speed, as the document approaches the registration position, by opening said normally closed clutch in response thereto, whereby said high speed drive is disengaged and shortly thereafter said reduction speed system automatically begins to drive said drive output at said lower speed by the automatic engagement of said over-running clutch upon the slowing down of said drive output to said lower speed.

Further features provided by the system disclosed herein, individually or in combination, include those wherein said normally closed clutch and said normally over-driven over-running clutch and said drive output are axially combined on a common drive shaft.

Some examples of various other copier art patents teaching document handler and general control systems therefor, including document path switches, are U.S. Pat. Nos.: 4,054,380; 4,062,061; 4,076,408; 4,078,787; 4,099,860; 4,125,325; 4,132,401; 4,144,550; 4,158,500; 4,176,945; 4,179,215; 4,229,101; 4,278,344 and 4,284,270, and 4,475,156. Conventional simple software instructions in a copier's conventional microprocessor logic circuitry and software of document handler and copier control functions and logic, as taught by the above and other patents and various commercial copiers, are well known and preferred. However, it will be appreciated that the document handling functions and controls described herein may be alternatively conventionally incorporated into a copier utilizing any other suitable or known simple software or hard wired logic systems, switch controls, etc. Such software for functions described herein may vary depending on the particular microprocessor or microcomputer system utilized, of course, but will be already available to or readily programmable by those skilled in the art without experimentation from the descriptions provided herein.

All references cited herein, and their references, are incorporated by reference herein for appropriate teachings of additional or alternative details, features, and/or technical background.

The present invention desirably overcomes or reduces various of the above-noted and other problems discussed in said references.

Various of the above-mentioned and further features and advantages will be apparent from the specific apparatus and operation described in the example below. The invention will be better understood by reference to this description of one embodiment thereof, including the drawing figures, (approximately to scale) wherein.

Figure 1:
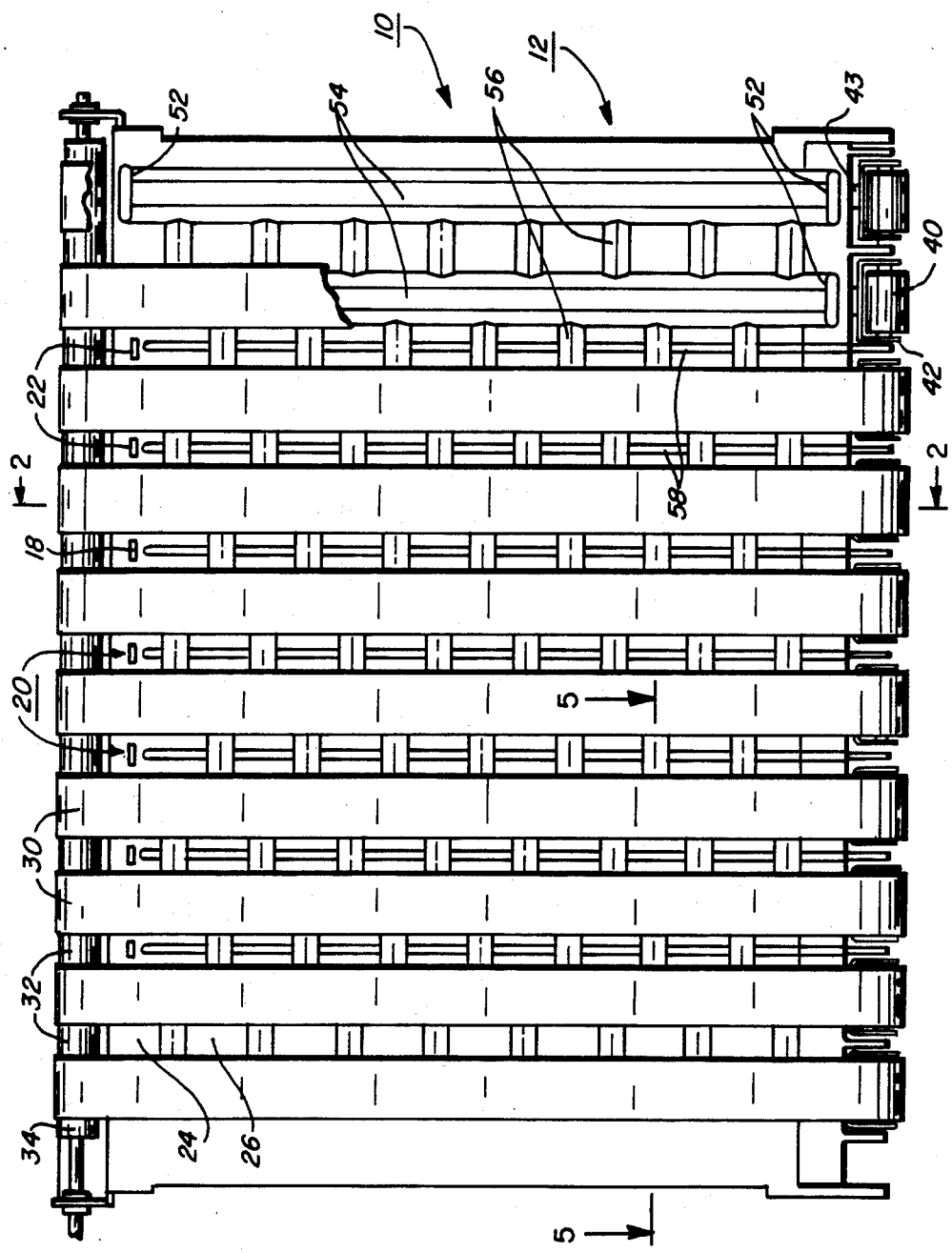
FIG. 1 is a bottom view of an effectively invisible platen transport system of a document handling system in accordance with the present invention.

Describing now in further detail the specific example illustrated in the FIGS. 1-8, there is shown the relevant novel details of an improved document handling system 10, and in particular the platen transport system 12 thereof, for sequentially transporting document sheets over the platen or imaging station 14 of a copier 16. The platen transport system 12 is adapted to register each document sheet 17 at a registration position 18 on the platen 14. Registration is provided by a registration system 20, including plural registration fingers 22 for engaging, stopping and deskewing, without damage, the lead edge of each document sheet 17.

It will be appreciated that the document handling system 10 disclosed herein may be utilized in either a semi-automatic, fully-automatic, and/or recirculating document feeder, of which various examples have been provided in the references cited above and their references. Likewise, this document handling system 10 or parts thereof, such as the platen transport system 12 per se, may be utilized with any conventional or appropriate copier, of which several examples have likewise been referenced and need not be described herein. The document handling system 10 may be constructed and operated at relatively low cost. It is relatively light in weight, and therefore easily pivotably mounted over a copier platen for lifting away from the platen for alternative manual document registration and copying. It provides reliable and high speed document feeding of documents in rapid sequence, closely spaced from one another. It provides reliable and accurate registration with protection from document damage. It also effectively eliminates "showthrough" copy defects and greatly reduces or eliminates "show-around" copy defects.

Figure 2:
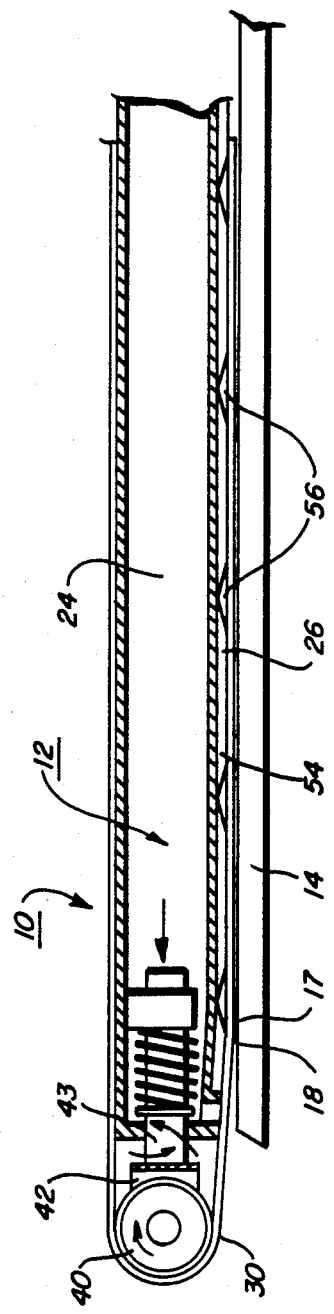
FIG. 2 is a cross-sectional view taken along the line 2—2 of FIG. 1, but with the depth of the transverse air channels greatly enlarged out of proportion for drawing clarity.
Figure 3:
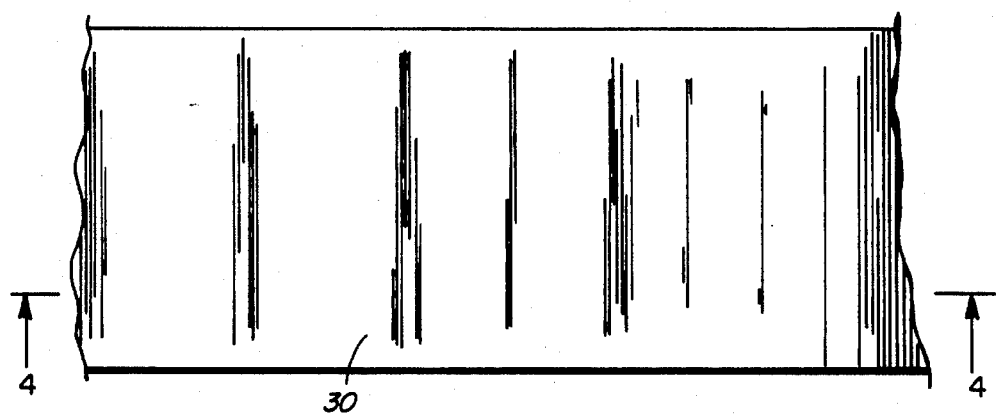
FIG. 3 is a bottom view of an enlarged segment of one of the transparent belts of the embodiment of FIGS. 1 and 2.
Figure 4:
FIG. 4 is a cross-sectional view thereof taken along the line 4—4 of FIG. 3.
Figure 5:
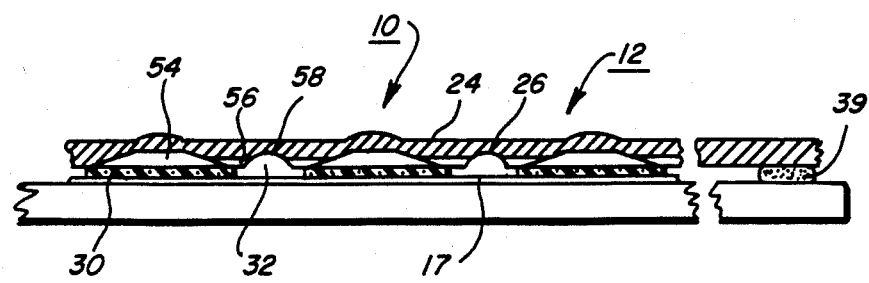
FIG. 5 is a partial cross-sectional view taken along the line 5—5 of FIG. 1.

Referring first particularly to FIGS. 1-5, the platen transport system 12 will first be described. It includes a vacuum plenum or manifold 24 having a white backing or imaging surface 26 closely overlying the platen 14. This plenum backing surface 26 is in turn closely overlayed with a plurality of moving transport belts 30, spaced apart by defined gaps 32. The belts 30 are each narrow, endless loops of transparent or highly translucent, low frictional, non-elastomeric, plastic belts. Preferably, these belts 30, which are particularly illustrated in FIGS. 3-5, are uniformly made from a single layer of commercially available transparent polyester material. They are preferably much less than ½ mm thick, and a thickness of only approximately 0.2 mm has been found to be operative and desirable. A belt 30 width of approximately 30 mm and gaps 32 of spacing therebetween of approximately 15 mm have been found to provide highly effective feeding with a low vacuum force, and without detrimental document deformation, as will be further described herein. These preferred belts 30 have a coefficient of friction in the range of approximately 0.3-0.35. Note that this is a very low friction in comparison to the conventional commercial document feeding belts of rubber or other elastomers which typically have a coefficient of friction of between 0.6 and 1.5, or higher. Such elastomer belts are typically much more expensive, less dimensionally stable, and tend to require frequent cleaning. Such elastomer belts may even require periodic oiling with silicone oil to provide appropriate slip registration of the document against the registration gate without damaging the document by overdriving it with excessive transporting force against the registration gate.

It has been demonstrated in actual practice that with these disclosed exemplary belts 30 and gaps 32, and the pneumatic system therefor provided by the vacuum plenum 24 imaging surface 26, (to be described) a vacuum source 28 providing partial vacuum levels in the order of only 8 mm (0.3 inches) of water, or less, may be applied to a document, yet provide highly effective document feeding, even though simple, low cost, low friction, non-elastomeric belts are utilized.

The belts 30, the gaps 32 therebetween, and the underlying imaging surface 26 of the vacuum plenum preferably extend over the entire area of the entire platen 14, not just the imaging area of a document at the registration position 18 (which, for most documents, will be only a portion of the entire platen.) This provides not only for the transporting of a wide variety of document sizes, but also for a wide range of reduction imaging of documents, wherein large areas of the platen outside of the document area may also be copied, i. e. exposed "show-around" areas.

It is important to note that none of the belts 30 are apertured. Unlike a normal vacuum belt transport system for documents, no vacuum is supplied or applied through any of the belts. Vacuum is applied to the document in the transport system 12 from the gaps 32 between the belts. It holds a document sheet against the belts 30 with sufficient force that the low friction engagement of the moving belts 30 against such vacuum-retained documents provides an adequate transporting force. That is, sufficient normal force between the paper sheet and the belts such that even with the low coefficient of friction of the belts there is sufficient forward transporting force to reliably transport the document with minimal slippage from the initial engagement of the document upstream (off of) the platen, then across the platen to the downstream edge thereof, i.e., toward and into the registration position 18, and then to eject the document from the platen after it has been registered and copied. The applied vacuum also helps to retain or lift up the belts 30 and the document sheets thereon out of substantial engagement with the platen 14, thereby reducing frictional resistance to feeding and static electricity generation between the document or belts and the platen. (Conventional brush or pin coronode or other electrostatic discharge means may be provided for the documents, the belts and/or the platen, if desired).

While unapertured and transparent or translucent belts are preferred, with some copiers correspondingly thin but white and even apertured belts may be utilized.

Preferably the platen transport system 12 has thin pads or spacing feet outside of the image area, as previously described with relation to the above-cited SIR publication, for maintaining the plenum imaging surface 26, and therefore also the belts 30 riding under it, slightly spaced from the upper surface of the platen 14. Preferably this spacing from the platen surface is approximately 1 mm for the belts, and 1.2 mm for the surface 26, (other than in its grooved areas, as will be described) depending on the optical system constraints. This insures that all portions of the document, even if curled or wrinkled, are held to within the optical depth of field or depth of focus or image distortion at field edges limitations of the imaging system of the copier 16. In this regard, it may be seen that all of the operative flights of the belt 30 overlying the platen are in substantially the same plane and maintained thereby by the substantially coplanar surface 26. In fact with the platen transport 12 disclosed herein, the entire surface 26 is within 2 mm of both the plane of the belts and the plane of the platen surface over the entire platen, even in the grooved areas of the surface 26.

Figure 6:
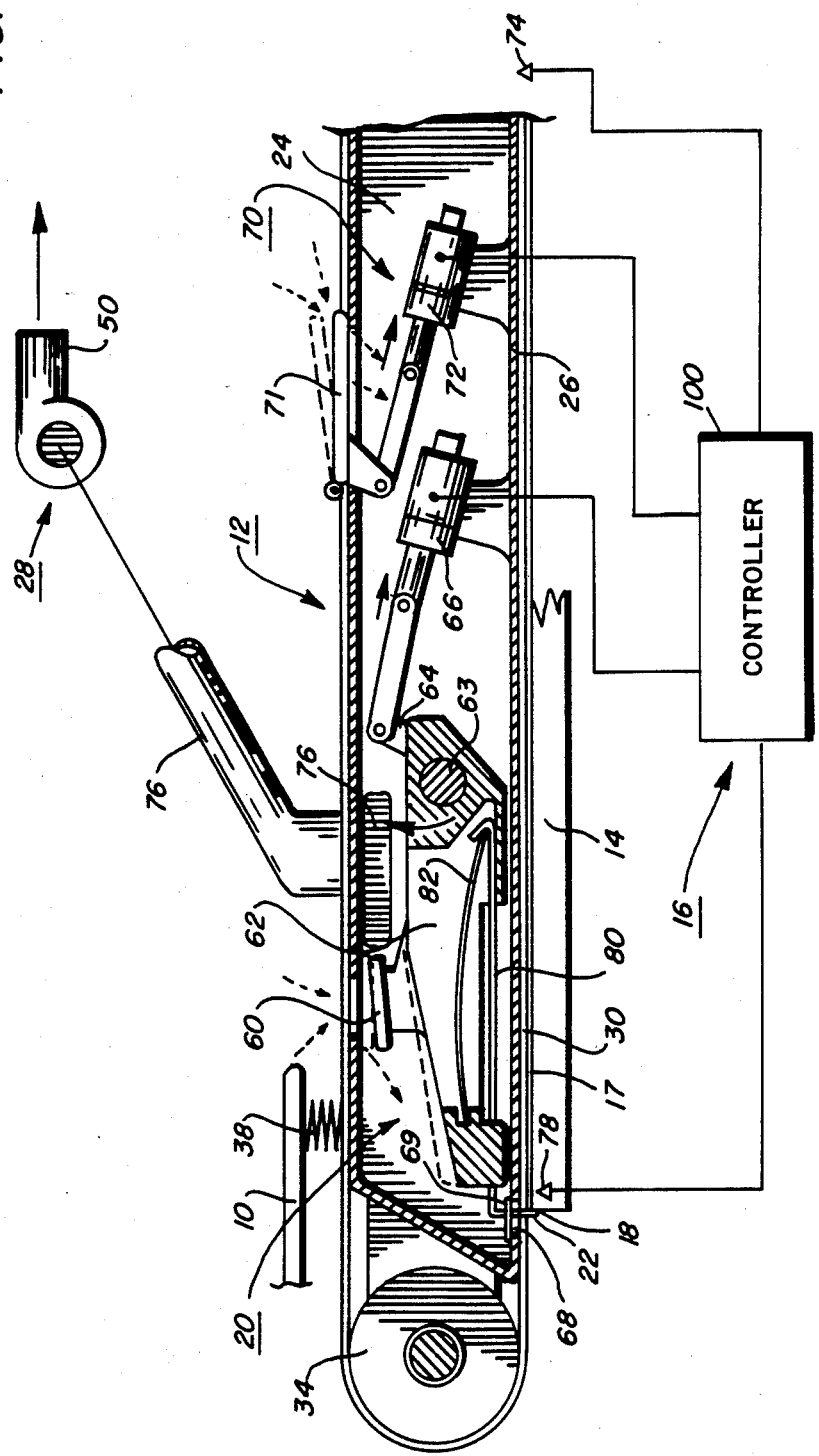
FIG. 6 is another cross-sectional view of the embodiment of FIG. 1, illustrating one example of an integral registration gate/vacuum reduction system.

The above described conformable mounting of the platen transport system 12 closely spaced over the platen 14 may be variously provided. Preferably, the entire platen transport system 12, comprising the vacuum plenum 24, its imaging surface 26, the belts 30 and their supports, and all of the components directly attached thereto, are mounted for a slight but controlled independent movement relative to the rest of the document handling system 10, i.e., relative to the cover and the frames of the system 10 which support the platen transport system 12, so as to better conform to the platen surface. For example, as illustrated in FIG. 6, limited axially deformable but transversely stiff coil springs 38 may be provided at the four corners of the upper surface of the vacuum plenum 24, outside of the area of the belts 30. These springs 38 provide the mounting of the platen transport system 12 to the frame of the document handling system 10, which allows some independent vertical movement of the platen transport 12 but prevents its lateral movement and therefor maintains lateral registration of the transport and registration system. It allows the imaging system 26 of the platen transport and the belts 30 thereon to independently closely conform to the plane of the upper surface of the platen 14. The actual spacing may be controlled and accomplished by spacing pads or feet 39 as shown in FIG. 5 extending from the surface 26 to establish and maintain the desired spacing distance from the platen. These spacing pads 39 are positioned on the surface 26 so as to engage either the outside corners of the platen outside of the document transporting and imaging area, or, alternatively, to engage the upper surface of the copier, outside of the entire platen area. The independent mounting provided by these springs 38 allows all of the pads 39 to engage the platen, and therefore allow the surface 26 to be closely parallel thereto, irrespective of mounting or alignment errors in the conventional hinge mounting to the copier of the document handling system 10.

The lower or outer (document transporting) surface of the belts 30 should be sufficiently smooth so as to resist the accumulation of contaminants such as paper lint thereon, and so as to maintain the preferred transparency of the belts to the imaging illumination from the copier. That illumination is up through the glass platen 14 and through the belts 30 to the white reflecting backing surface 26 therebehind, and then back down through the belts 30 and the platen 14 to the imaging system of the copier, with a sufficiently high light transmission to "wash out" or adequately discharge the photoreceptor, and thereby be effectively invisible to the copier, i.e. to not make any visible image on the copy sheets from any part of the belts 30 or the surface 26. This system is designed to be effectively invisible to any of the various conventional copier imaging systems, including "flash" illumination of the entire document, or "scanning" or "slit illumination" systems, etc., variously known to those skilled in the art.

However, if desired, as illustrated in FIGS. 3 and 4, the outer surface of the belts 30 may be, for example, very slightly and smoothly transversely grooved, by embossing, molding, knurling, or the like, with surface undulations of less than 0.1 mm, so as to provide some assistance to some additional partial vacuum application between the transported document and this belt surface, by a slight air flow under the document over the belt surface. However, this is not required, and is not a significant vacuum document hold-down force component. In the present system, that is provided by the vacuum applied in the gaps 32 between the belts.

The bottom wall of the vacuum plenum 24 providing the imaging surface 26 is formed with sufficient stiffness so as to maintain the flatness of that surface 26. This may be assisted, as shown in FIG. 5, by stiffening ribs or corrugations on the interior surface thereof.

Preferably the entire platen transport system system 12 is based on a single monolithic white plastic molding which forms the entire vacuum plenum 24, including the surface 26, and also has formed at the ends thereof the mounting members for the rollers driving and supporting the belts 30, and for other components to be described hereinbelow.

As noted above, the inside surfaces of the lower flights of the belts 30 over the platen are supported by and slide over especially designed portions of the backing surface 26 of the plenum 24. As also described above, preferably an automatic spacing system maintains a very close and uniform spacing between said surface 26 and the platen, which maintains the lower flights of the belts 30 over the platen within that same spacing.

As shown in FIGS. 1 and 2, the opposite ends of each belt loop are mounted on rollers at opposite ends of the platen transport system 12, outside of the platen area. All of the belts are commonly held in the same relative position at one end thereof on the common driven roller 34. However, it may be seen that the opposite end of each belt is independently supported on independent pivotal rollers 40, as shown in FIG. 2. Each of these rollers 40 is freely rotatable about its own cylindrical axis. Each roller 40 is rotatably mounted between the extending arms of a yoke 42. Each yoke 42 has a central mounting shaft 43, spring-loading it outwardly, to independently tension each belt 30 by the outward force applied to the roller 40. This mounting shaft 43 is itself rotatable about its own axis, which is an axis perpendicular to the axis of rotation to the rollers 40. This allows each roller 40, and therefore the belt 30 thereon, to "tilt" slightly in either direction relative to the plane of the surface 26 and therefore relative to the normal plane of the belt 30. This provides a desirable self-tracking or alignment of each belt 30. In addition, the extending arms of the yoke 42 between which the roller is mounted provide edge flanges which limit the lateral travel of the belt and prevent the belt from coming off of either end of roller 40.

Turning now to the vacuum system for the platen transport system 12, the vacuum source 28 is provided by a conventional but very low pressure fan, blower or pump 50. Preferably the vacuum source 28 is pneumatically connected to one side (the rear end) of the vacuum plenum 24, shown by conduit 76 in FIG. 6. A very low level of partial vacuum is applied, in the order of 8 mm (0.3 inches) of water or less. To operatively communicate this vacuum for document transporting, it must be provided between the document and the backing or imaging surface 26. With the present system, this is accomplished without any vacuum apertures whatsoever in the manifold surface 26 anywhere overlying the platen 14. The only apertures at all in the imaging surface 26 are vacuum apertures 52 located along the opposite (input and output) edges of the transport system 12 outside of the area of the surface 26 covering the platen 14. These vacuum apertures 52 are located at opposite ends of elongated vacuum channels 54. These concave channels 54 extend across the surface 26 underlying the belts 30 and are covered by the lower flights of the belts 30, as shown in FIG. 1 and FIG. 5. The edges of the belts ride on areas of the surface 26 at opposite edges of the vacuum channels 54. Each belt thus effectively seals one channel 54, except for the interchannel pneumatic paths 56 described below. Although the channels 54 are relatively shallow, they have sufficient cross-sectional area to conduct the relatively low requisite air flow therealong with relatively low resistance, and thereby to relatively uniformly apply the same vacuum level along the entire channel 54. If desired, different vacuum levels may be provided in different channels 54, but that is not necessary.

As may be seen in FIG. 5 and (exaggerated) in FIG. 2, each channel 54 has communicating therewith a plurality of cross channels 56. These are much smaller in all dimensions and are for pneumatically communicating the partial vacuum into the gaps 32 between the belts from the channels 54 with as little surface 26 perturbation as possible in the gaps 32 since these gaps are directly exposed to the copier optics. Both the channels 54 and cross channels 56 have very gently sloping and preferably planar side walls with angles of less than 45 degrees relative to the surface 26 so as to be substantially as highly reflective as the rest of the surface 26 and therefore effectively optically invisible. The depth of the main channels 54 may be approximately 2 mm. The depth of the cross channels 56 may be approximately 0.5 mm.

There may be optionally provided additional channels 58 in the gaps 32 parallel to the channels 54, i.e. parallel to the direction of movement of the belts 30. These 58 are in communication with the opposite ends of the cross channels 56 from the main channels 54 and therefore supplied with partial vacuum through the cross channels 56. The width of these gap channels 58 is, as shown, less than the width of the gaps 32 so as to be outside of the area of the belt 30. A suitable depth is approximately 1 mm.

Note that all of the grooves on the surface 26, i.e., the vacuum channels 54, 56 and 58, are all "V-shaped". That is, they have preferably flat side walls, so that the angles from the horizontal are consistently less than 45 degrees.

As indicated, the gap channels 58 are optional. However they provide a useful function when very large original documents are being transported by the platen transport system 12. In the case of a very large document, particularly an A-3 size document being fed short edge first by the platen transport system 12, the document covers virtually the entire transport and therefore restricts the air flow in the system into the vacuum channels and thereby tends to increase the partial vacuum level and the vacuum holddown force to an undesirably high level. Two systems are provided for compensating for such large documents, which may be used individually or in combination. The first is the above-described channels 58, which extend from just short of the registration fingers out to, and opening at, the opposite end of the plenum surface 26, as shown in FIG. 1. Thus the open ends of these gap channels 58 provides sufficient intake air flow for maintaining the proper level in the vacuum system even if the entire transport system 12 is overlayed with a large document.

The second disclosed system for providing the desired vacuum transporting forces for large documents is illustrated in FIG. 6. In fact, two such systems are illustrated in FIG. 6. The first is a vacuum relief valve 60, which, when opened, partially vents the vacuum plenum 24 to atmospheric air by opening an aperture in the upper surface of the plenum 24. A desirable vacuum relief valve 60 is disclosed which is an integral part of the registration system 20. Specifically, whenever the registration fingers 22 are down, in the document path for document registration, the valve 60 is automatically opened. Correspondingly, when the fingers 22 are lifted, for document transporting by the belts 30, as illustrated by the dashed line position of the registration system 20 here, the valve 60 is closed, to apply increased vacuum forces for non-slip transporting of the document sheet. By automatically opening the valve 60 during the (solid line) registration position of the registration system 20, the valve 60 is partially venting the partial vacuum in the vacuum plenum, and thereby the forward transporting force of the belts 30 against the documents is automatically reduced, thereby reducing the force with which the document is being driven by the belts 30 into impact with the fingers 22, and thereby avoiding or reducing the tendency for damage of the document sheet by the registration system 20.

Referring to the registration system 20 and FIG. 6 in more detail, it may be seen that all of the registration fingers 22 are mounted on individual registration finger arms 62. The upstream ends of all of the arms 62 are pivotably mounted to a common registration shaft 63. The shaft 63 in turn is slightly rotatable clockwise by a connecting arm 64, pulled through a pin linkage by operating solenoid 66. Thus, the actuation of the solenoid 66 slightly rotates all of the finger arms 62 and thereby lifts all of the registration fingers 22 upwardly away from the document path and into the vacuum plenum 24. Note that all of the above-described components are conveniently located inside the vacuum plenum 24. The registration fingers 22 are each retractable in the above-described manner through corresponding finger holes 68 through the surface 26. These holes 68, and the fingers 22 which are reciprocally vertically movable therethrough, are preferably located closely adjacent to or directly abutting the downstream end of the platen 14. In that position the fingers 22 desirably define a registration position for the imaging area of the copier at the downstream edge of the platen, and the fingers 22 can drop during registration below the upper surface of the platen. Thus a positive stopping registration is provided, since the lead edge of the document is confined between the belts 30 and the upper surface of the platen 14, yet the fingers 22 during registration extend from well above to well below these two surfaces to provide a positive gate, even for curled-edge documents. Likewise, when the registration gate is opened by the lifting of the fingers 22, even if a document lead edge were to attempt to lift therewith it would be stripped off automatically as the fingers are retracted, because the fingers retract fully within the surface 26 into small individual finger holes 68, and there is no transverse slot or gap in the surface 26 or at the platen edge in which the lead edge of the document could be captured. (Note that this is in contrast to the tendency of some conventional registration finger systems, which retract down below the platen, to occasionally capture document lead edges between the fingers and the platen edge.)

The second and alternative or additional automatic vacuum reduction system illustrated in FIG. 6 is provided by a separate vacuum reduction system 70, including a large dump valve 71 and a second solenoid 72. The dump valve 72 is a separate large door or flapper on the upper surface of the vacuum plenum 24, normally held closed by the partial vacuum within the plenum 24. When this dump valve 71 door is pulled open by the actuation of solenoid 72, through a connecting arm and pin linkage, the valve 71 opens to expose a large aperture in the upper surface of the plenum 24 to atmosphere, thereby dumping or dropping the vacuum level within the plenum 24 rapidly to a very low level, e. g. less than 25 mm (0.1 inch) of water. Preferably this second vacuum reduction system 70 is automatically operated in direct response to the sensing or determination of a document sheet size of greater than a predetermined size, prior to that oversized document being transported into the registration system 20. As illustrated in FIG. 6, this can be accomplished by an upstream or platen entrance sensor 74, of a known type, which senses the length and/or width of each document as it is being fed onto the platen 14 by the platen transport system 12. For example, an oversized document can be detected simply by comparing the time the sensor 74 is occluded by a document with a preset fixed time or count, since the transport velocity is a known constant. This may be done with simple software in the conventional controller 100 of the copier 16, in a known manner. The resulting signal indicating an oversized document, e.g. shortedge-fed A-3, may then be utilized directly by the controller 100 to actuate the solenoid 72 after a predetermined count corresponding to the transporting of the document to a desired preset distance upstream of the fingers 22. (Note that the lead edge position of the document is also known from the initial actuating time of the sensor 74 and the transport velocity.) Thus, the vacuum transporting forces on a large document are automatically reduced just as the document lead edge reaches the position at which it must be allowed to slip relative to the belts 30 for both deskewing and registration without lead edge damage. This can be in cooperation with, and commonly controlled with, the automatic operation of the vacuum relief valve 60. For ejection of the oversized document, the valve 71 may be automatically closed by removing power from the solenoid 72 at any time after registration. Solenoid 66 may be actuated simultaneously or thereafter.

Alternatively, particularly if oversized documents are previously sensed by plural document width detectors spaced transversely across the document path, or from the document input tray side guide setting, or other input signal, the vacuum relief valve 60 may be held open not just for registration of an oversized document, but for its entire transporting sequence. This may be particularly desirable if the surface 26 does not have the above-described gap channels 58 or other means to provide adequate air flow for large documents being transported.

Note that the valve or valves 60 are closed by an integral extension of at least one finger arm 62. Thus no separate actuating system or structure is required for operation of the valve 60, and it automatically operates with and by the operation of the registration system 20. The unit of finger arms 62 and their integral fingers 22 and valve 60 is normally held down by its own weight except when they are all lifted together by rotation of the common shaft 63 by the solenoid 66.

A small seal 69 may be optionally provided on each finger 22 to seal each finger hole 68 pneumatically, and provide a light reflective surface over each hole 68, when the fingers 22 are in their down position. However, this is not essential. As an alternative, each finger unit, i.e., the finger arm 62 and its attachments, can be in a separately-walled enclosure separated from the rest of the vacuum plenum 24 so that no significant vacuum is applied to the finger hole 68. Either that system or the seals 69 also function to prevent contaminants from being sucked in through the small finger holes 68.

Note that operating with a greatly reduced vacuum force for very large documents also reduces any tendency for for very thin documents, such as Japanese rice paper, to be deformably sucked against the surface 26 in the gaps 32. On the other hand, too low a vacuum force acting on the document can allow too much of the document to sag or droop away from the belts and drag across the platen surface with excessive frictional resistance to movement or static generation, particularly since the desired spacing between the surface of the belts and the surface of the platen is only approximately 0.5 to 0.1 mm.

It will be appreciated that another alternative system for rapidly reducing the vacuum level of the platen transport system 12 is to provide a solenoid-actuated butterfly valve or the like (not illustrated) in the vacuum input line 76 from the vacuum pump or blower 50. An alternative to the upstream sensor 74 and a time delay is a downstream or pre-registration sensor 78 positioned for direct and immediate actuation of one or both solenoids.

Although belts 30 mounted for movement perpendicular to the line formed by the registration fingers 22 are illustrated here, it will be appreciated that the belts 30 may alternatively be mounted at a slight angle for some lateral movement for corner registration of the document. This is described, for example, with reference to the embodiment of FIG. 1 of the above-cited U.S. Pat. No. 4,322,160 to G. S. Kobus, Col. 6, lines 48–59. Such a system may need even greater protection for the document lead edge because of the skewed document impact at registration in most cases rather than only occasionally.

An additional feature may be provided for assisting in the reduction of potential lead edge document damage by the registration system 20. This is to provide a 2-speed platen transport system 12, in which the approach of the document lead edge to the fingers 22 may be directly sensed by a registration approach sensor 78, or calculated by a timed count from an upstream sensor 74, by the controller 100, as previously described. The platen transport system may be substantially slowed down at that point in time so that the document will be moving more slowly, with reduced finger impact, as the registration position 18. However, this requires an additional initial clutch mechanism, such as will be described with reference to FIG. 9, or a servo or stepper motor drive of the platen transport, all of which can be avoided by the above-described vacuum force reduction system and/or the novel force limiting and energy absorbing registration finger system to be described hereinbelow.

Figure 7:
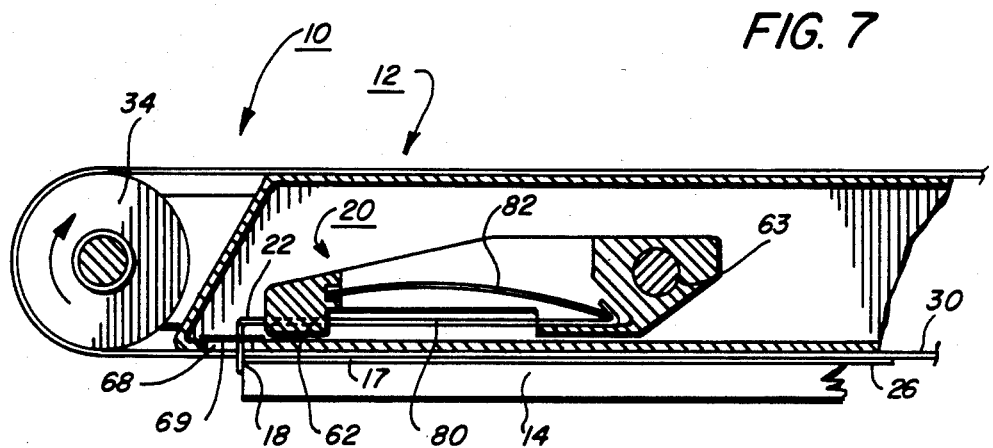
FIGS. 7 and 8 are enlarged partial cross-sectional views, illustrating the exemplary force-limiting registration finger system by providing a side view of one of said fingers in different operating positions, as will be described herein.
Figure 8:
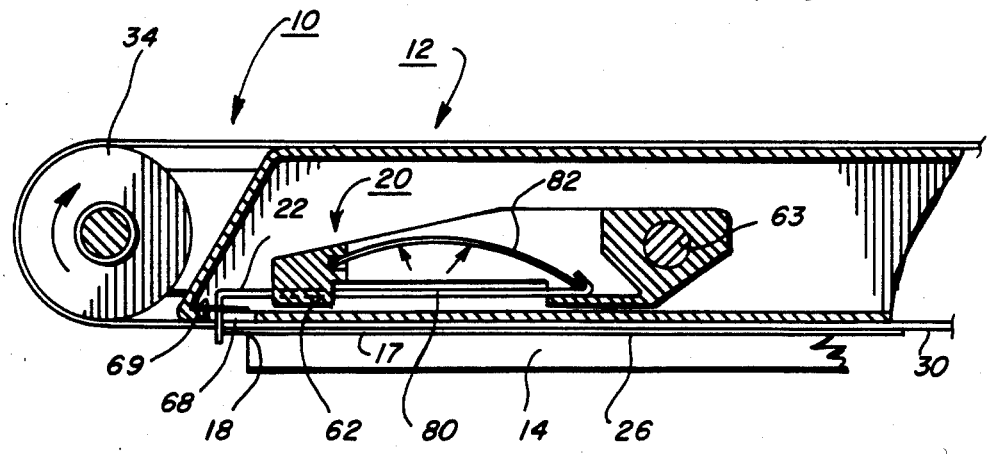

There is disclosed in FIG. 2, and in particular in the alternative position views of FIGS. 7 and 8, a novel system of a low mass, specially spring preloaded, registration system 20 for providing specially deflectable registration fingers 22 which deflect as they are impacted by the document lead edge to absorb a substantial portion of the document impact and thereby protect the document lead edge from damage. Yet the fingers 22 in the registration system 20 are not deflected out of the document path. They remain vertical and in the document path at all times whenever they are in their normal, lowered position. As illustrated in FIG. 8, as compared to FIG. 7, the impact of a document lead edge against finger 22 pushes it slightly downstream i.e. in the document movement direction. The finger 22 is mounted to allow this by means of a finger horizontal mounting portion 80 which is mounted for slidable horizontal movement relative to the registration finger arm 62 in which it is mounted. However, this slidable downstream movement of the finger 22 is resisted by a special, individual, finger spring 82. The spring 82 acts to return both the finger 22 and the document which impacted it back upstream slightly into the proper registration position.

The amplitude of this deflection of the fingers 22 is a function of the document mass, the document speed, the forward transporting force of the belts 30 acting on that document, and the resistance to that deflection provided by the total force for that deflection of all of the springs 82 being deflected by that document. The spring force 82 is preloaded such that the belt slippage frictional force is overcome, i. e., so that the fingers 22 are only deflected by the initial document impact, and then the document can be slid back upstream, against the force of the moving belts, into the preloaded registration position. While frictional or other damping means may be employed, it has been found that with the system disclosed here this is not required. In particular, it has been found that the elongate buckling leaf configuration of the spring 82 illustrated provides very rapid settling or damping characteristics as well as appropriate finger deflections. This spring 82 is deformed as a "buckling column" by forces applied from the opposite ends thereof. That is, one end of the spring 82 is compressed by the end of the finger horizontal portion 80, while the other end of the spring 82 is held (to provide a counter-force and prevent its forward movement) by its mounting to the registration finger arm 62 as shown.

The disclosed impact absorbing registration system 20 has been found to provide protection against document damage for document transporting and registering (impact) speeds in excess of 200 cm per second. At those velocities the lead edges of many documents would be damaged by impacting a fixed set of registration fingers, particularly where small interbelt fingers (as here) rather than a single wide registration gate are utilized. With the present system, document damage can be prevented, at these transport velocities, even with only seven registration fingers of only approximately 6 mm width. With the cantilevered springs 82 preloaded to approximately 20 grams, registration can be accomplished with such fingers with less than a 30 gram maximum force per finger against the document lead edge, which will not cause any document damage.

In the document registration illustrated in FIGS. 7 and 8 the position of the initial contact of the document lead edge with the fingers 22 is illustrated in FIG. 7. This initial impact pushes the impacted fingers 22 slightly downstream against the preloaded spring force by a controlled deflection distance, illustrated in FIG. 8. Then the force of the deflected fingers springs 82 pulls these fingers, and the abutting document, back into the initial, and registration, position of FIG. 7. Meanwhile, the belts 30 and their driving roller 34 may continue to move at the same velocity.

In addition to the limitation on finger 22 deflection provided by the finger spring 82 and frictional resistance within the registration system 20, an additional or ultimate deflection stop or limit may be provided by the position of the downstream end of the finger hole 68. However, it is preferred that the registration system 20 be so designed as to not utilize such a "hard stop" but rather to have the maximum finger force and deflection be controlled primarily by the finger spring 62, and secondarily by the frictional resistance to finger movement of the finger mounting (here at the horizontal extension 80 of the finger) as this finger mounting slides relative to the rest of the registration system 20.

Note that here each actual registration finger 22 and the horizontal portions 80 thereof, including the bent-over end of the member 80 in which one end of the spring 82 is mounted, is a single unitary "L" shaped metal strip. The horizontal portion 80 is long enough, and appropriately mounted to the registration finger arm 62, so as to minimize or prevent any lifting or pivoting action on the finger 22 from the document impact. Note also that the fingers 22 here are downstream of, and only slightly below, the horizontal portions 80 thereof, so as to minimized the rotational force thereon. The axis of rotation of the shaft 63 of the registration system is likewise closely spaced above the platen and well upstream of the fingers 22 to minimize any rotational couple forces, so that the fingers 22 will not rotate or pivot out of the registration position due to document impact thereagainst.

The horizontal portion 80, and/or the impact surface of the fingers 22, may be, if desired, coated with a relatively high friction surface, or appropriately roughened or otherwise surface treated, to prevent slippage of a document and/or to increase the frictional resistance to movement of the horizontal portion 80.

The registration system 20 is capable of holding the document indefinitely in the registration position even for continued high speed operation of the platen transport system 12, i. e. with continuous slippage between the belts 30 and the document. However, the copier controller 100 may be optionally programmed to shut down the drive of the platen transport system and/or the vacuum source 28 whenever the copier has been programmed to make, for example, five or more sequential copies of the same document, so as to reduce frictional contamination or wear of the document and/or the belts. However, this is not essential. Preferably in such a case the transport system 12 will be restarted automatically prior to the completion of the copying (the last scanor flash of the document) so that that document may be ejected without delay simply by the lifting of the registration fingers 22 by the solenoid 66.

Because the belt drive need not normally be turned off for document registration with this system, the next succeeding document which is to be copied may be started onto the platen before the completion of copying of the preceding document. That is, the platen transport 12 is not disabled from transporting the succeeding document by the registration of the preceding document, except for very large documents.

An additional advantage of the elongate buckling column spring 82 is that the spring force on each finger 22 remains substantially constant over the entire finger deflection range. A suitable maximum deflection is approximately 4 mm. from the registration position. With the preloaded spring force set at about 20 grams per finger, to which is added the frictional damping force resistance to the movement of the finger, e.g. about 8 grams, the total maximum resistance to finger movement is less than 30 grams throughout its entire range of movement. Such forces will not damage normal documents and furthermore can achieve settling times, for the document settling into its registration position, of less than 20 milliseconds, even with document impact velocities in the order of 100 cm per second.

A further feature of the disclosed registration system 20 that the damping friction acting on the fingers may be reduced to very low levels without significantly increasing that document settling time. In contrast, different systems in which the fingers 22 were themselves cantilevered spring tips were found to have undesirbly high, multiple bounce, settling times of up to 100 milliseconds, unless additional damping was introduced by pressing the tips of the fingers 22 against the platen glass to cause drag forces. However, that is undesirable for other reasons, including possible escape of the document from between the finger tips and the platen, and possible wear or scratching of the platen glass.

With the present system, it has been found that no added damping is required, and the finger horizontal portion 80 for each finger 22 may be simply supported and guided within slots or grooves cast directly into conventional low friction plastic members, here as an integral portion of the registration finger arm 62. The disclosed registration system has been operated wtih frictional drag forces on the finger deflection of only about one to two grams, with said 20 grams of spring loading, without increasing the settling time. No special or critical frictional surfaces or friction settings were required. Why such unexpectedly high damping was obtained even with such low frictional forces is not fully understood, but is believed to be inherent in the disclosed structure, particularly the particular spring geometry and mounting of the springs 82.

Figure 9:
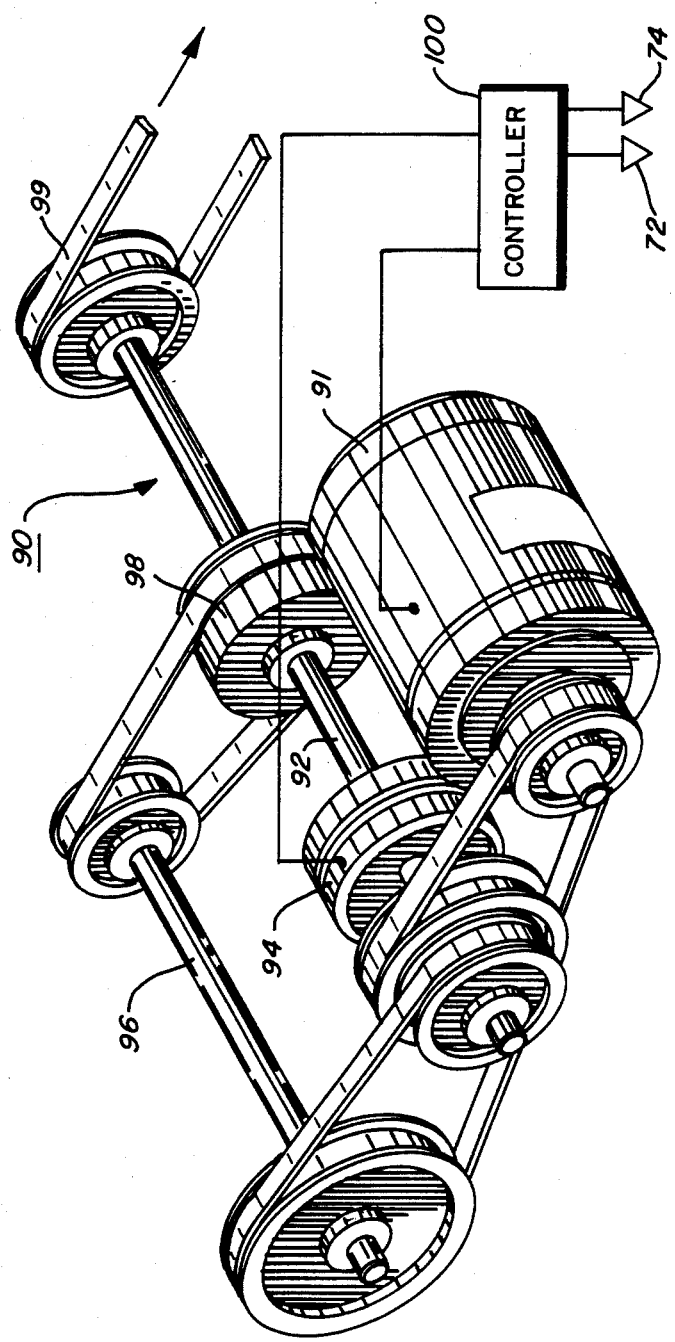
FIG. 9 is a perspective view of an alternative or additional 2-speed drive mechanism for the platen transport system of FIGS. 1-8.

Referring now to FIG. 9, there is shown an optional 2-speed drive system which may be provided for the platen transport, so that the platen transport belts may be driven at high speed until shortly before the lead edge of the document reaches the registration position and then briefly and rapidly slowed down, so that the document impacts the registration fingers 22 at a much lower transporting velocity, for document protection. The disclosed 2-speed system 90 is appropriate for the fast response time that is required. This system 90 changes velocity quickly at the required times so that high speed transporting is provided for all document movement except during registration. However, it has only one small drive motor 91, which desirably operates continuously at the same rotational speed.

The actuation of the 2-speed drive system 90 by the controller 100 may be initiated by either the upstream or registration approach sensors 74 or 72, previously described and shown in FIG. 6. For the normal, high speed, driving of the document transport, the motor 91 drives a main shaft 92 which in turn drives the output belt 99 driving the roller 34. The roller 34 drives all of the belts 30, as previously described. This normal high speed drive is via a normally open electro-mechanical clutch 94 in the shaft 92. This electrically actuated clutch 94 may be of a commercially available type which can be actuated by a conventional transistor drive circuit from the controller 100. While clutch 94 is thus "normally open" in the conventional electrical sense that it is disengaged unless electrically actuated, since its normal mechanical operation here is engaged closed for the normal high speed drive, as described, this clutch is referred to elsewhere herein as normally closed. The motor 91 may be a simple, low-cost, electric motor. A multi-speed, servo, or stepper motor is not required.

The system 90 automatically switches to its low-speed drive just before the lead edge of the document strikes the fingers 22, and may then be switched back to its normal high speed operation just prior to the completion of copying of the document, or alternatively, automatically after a brief preset time period has been provided for the impacting and stopping of the document sheet by the registration fingers 22. This low speed output is preferably such as to provide a belt velocity of approximately 50 cm per second or less. This low speed output is automatically provided as soon as the electro-mechanical clutch 94 is opened. Preferably it is rapidly opened by a higher than normal electrical pulse applied thereto by shutting off the drive circuit. With the clutch 94 open, the velocity of the output belt 99 is no longer directly driven through the shaft 92. Instead, it is driven through a normally overrunning clutch 98 from a low speed or reduction drive shaft 96. The reduction drive shaft 96 is continuously run at a lower velocity by the illustrated reduction drive from the same motor 91. During normal high speed operation the overrunning clutch 98 is disengaged because of the lower speed at which it is being driven by the reduced speed shaft 96 relative to the main shaft 92. Once the clutch 94 is opened, the overrunning clutch 98 automatically promptly engages, upon the slowdown of the output 99, to drive that output at the lower velocity. The lower velocity is preset by the pulley ratios between the motor 91, the shaft 96, and the input to the clutch 98.

The 2-speed drive capability provided by the system 90, or other appropriate system, may also be utilized for appropriate feeding and registration of fanfold web input such as computer forms, using the same platen transport system, as taught for example in the above-cited U.S. Pat. No. 4,485,949. In that case, sprocket hole counting sensors may be utilized to determine the appropriate imaging positions of the web, since the registration fingers 22 must remain lifted for all such web feeding. By switching the feeding of the web to a much lower speed as the desired registration position is approached by the web, a more accurate imaging and/or stopping position can be provided, i. e. the tendency of the belt transport system to overrun or overshoot the registration position is greatly reduced if it is approached at a lower velocity, as is known from the abovecited references.

The system 90 also may be made selectively operable only in response to predetermined document sizes. That is, the drive system 90 may be automatically maintained in its high speed mode at all times for small documents, where there is less chance of document damage by high speed registration impact, and only switched to its intermittent low speed mode for registration of a document of larger than a predetermined size. This may be accomplished, as previously described, by either the sensor 74 and a timing circuit, or sensor 72, or a combination of both sensors 74 and 72, and/or transverse document dimension sensors. This can be provided simply by programming the controller 100 to only open the clutch 94 in response to a combination of input signals indicating both such an oversize document and the approach of the lead edge of that document to the registration fingers 22.

Note that the system 90 still allows for high speed document exchange times and normal high speed document feeding, which is particularly desirable for a high rate circulating document handler. The system involves the change in velocity of relatively low masses and rotational inertia, particularly with the use of small diameter and lightweight belts, pulleys, and clutches, and the very lightweight and low friction nature of the belts 30 and their supporting rollers 34 and 40 in the document transport 12. This reduces wear, power requirements and noise. Furthermore, this 2-speed drive does not interfere with the above-described capability of reducing document exchange times by allowing the next document to enter the platen imaging region while the preceding document is still being scanned at the registration position. Note that even with this system 90, the belts 30 are only slowed down, and not normally ever stopped, for individual sheet documents. Only fanfold web document may require stopping. In a flash illumination system a web can even be imaged at the low speed, without stopping.

While the embodiments disclosed herein are preferred, it will be appreciated from this teaching that various alternatives, modifications, variations or improvements therein may be made by those skilled in the art, which are intended to be encompassed by the following claims:

What is claimed is:

1. In a drive system for a document feeder transport for a copier with a drive output normally driven at a high speed for document transport and driven at a lower speed for document registration at a registration position, the improvement wherein said drive system comprises a drive motor and a high speed drive normally driving said document feeder transport through an electrically normally closed clutch in said high speed drive, and a reduction speed system also simultaneously driven by said drive motor, said reduction speed system including a normally over-driven overrunning clutch connected to, but normally disengaged by, said high drive, and means for automatically rapidly and smoothly switching said drive output to said lower speed, as the document approaches the registration position, by electrically opening said normally closed clutch in response thereto, whereby said high speed drive is disengaged and shortly thereafter said reduction speed system automatically begins to drive said drive output at said lower speed by the automatic engagement of said over-running clutch upon the slowing down of said drive output to said lower speed;

wherein said means for automatically switching said drive output to said lower speed is actuated only in response to the sensing of a document of larger than a predetermined size and the approach of the lead edge of that document to said registration position; and wherein said normally closed clutch is rapidly opened by shutting off the drive circuit therefor.

2. The drive system of claim 1 wherein said normally closed clutch and said normally over-driven over-running clutch and said drive output are axially combined on a common drive shaft.

* * * * *